United States Patent [19]
Smith

[11] Patent Number: 5,393,194
[45] Date of Patent: Feb. 28, 1995

[54] GAME HANDLING APPARATUS

[76] Inventor: John E. Smith, 1014 S. Fifth, Monroe, La. 71202

[21] Appl. No.: 259,913

[22] Filed: Jun. 10, 1994

[51] Int. Cl.⁶ .......................... B60P 20/13; B60P 1/48
[52] U.S. Cl. .................................. 414/546; 212/186; 280/756; 414/914
[58] Field of Search ............... 414/546, 914; 280/756; 212/185, 186

[56] References Cited

U.S. PATENT DOCUMENTS

| | | | |
|---|---|---|---|
| 2,336,965 | 12/1943 | Shoemaker | 212/187 |
| 2,492,841 | 12/1941 | Burkey | 414/546 |
| 2,506,242 | 5/1950 | Shoemaker | 414/914 |
| 2,519,119 | 8/1950 | Dalbeck | 212/186 |
| 2,571,361 | 10/1951 | Harmanson | 414/546 |
| 2,704,615 | 3/1955 | Stokes et al. | 414/914 |
| 2,809,756 | 10/1957 | Bannister | 212/186 |
| 3,997,029 | 12/1976 | Evans | 414/914 |
| 4,666,183 | 5/1987 | Azzarello | 280/756 |
| 4,854,628 | 8/1989 | Halberg | 280/756 |
| 5,174,622 | 12/1992 | Gutta | 280/756 |

Primary Examiner—Michael S. Huppert
Assistant Examiner—Thomas J. Brahan
Attorney, Agent, or Firm—John M. Harrison

[57] ABSTRACT

A game-handling apparatus which is mounted on a four-wheel all-terrain vehicle having a winch fixed to the vehicle with a winch line wound on a winch drum in the winch, the game-handling apparatus including a first roller mounted on the front of the vehicle above the winch for guiding the winch line from the winch upwardly, a roll bar pivotally secured to the vehicle and fitted with a middle pulley for guiding the winch line rearwardly and a rear roller attached to the rear of the vehicle for guiding the winch line downwardly behind the vehicle. A sling is attached to the end of the winch line and the sling is secured around a game animal such as a deer, after which, the winch is operated to wind the winch line on the winch drum and lift the deer into field-dressing configuration or onto the all-terrain vehicle for transportation.

20 Claims, 1 Drawing Sheet

U.S. Patent    Feb. 28, 1995    5,393,194
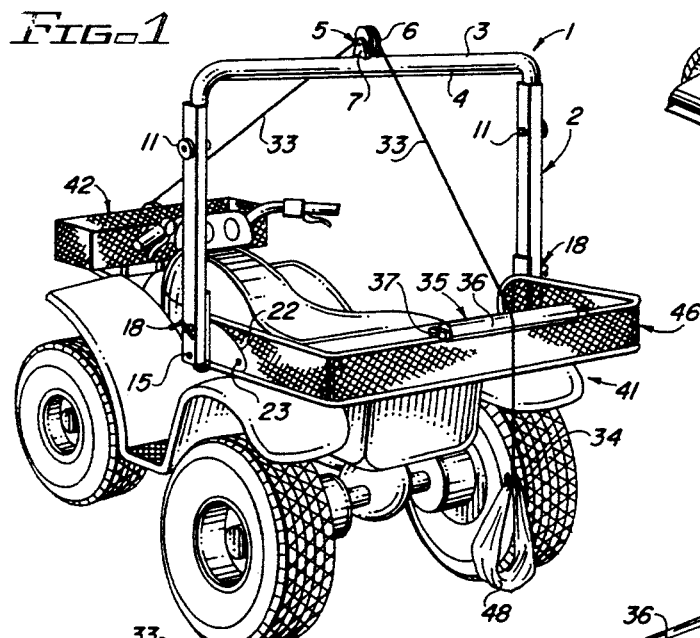
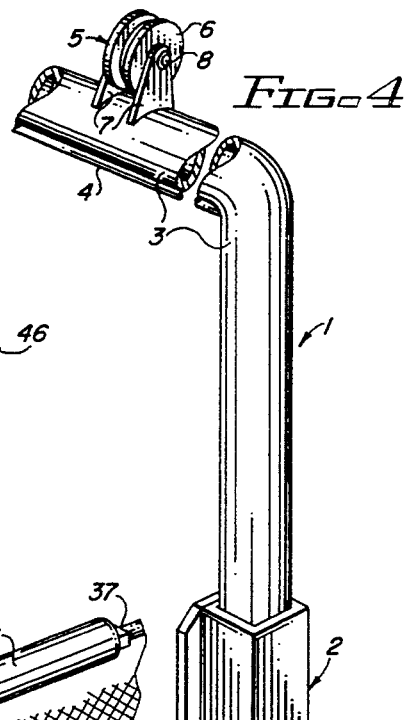
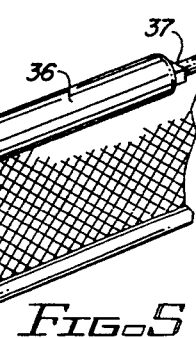
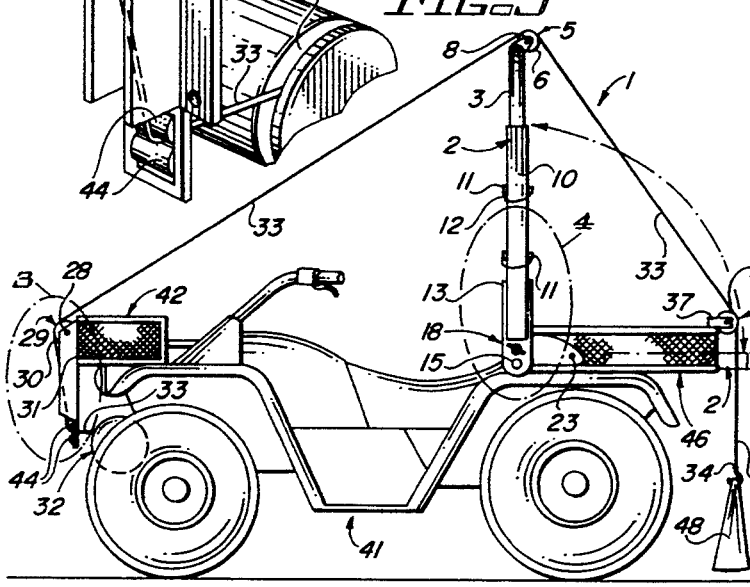
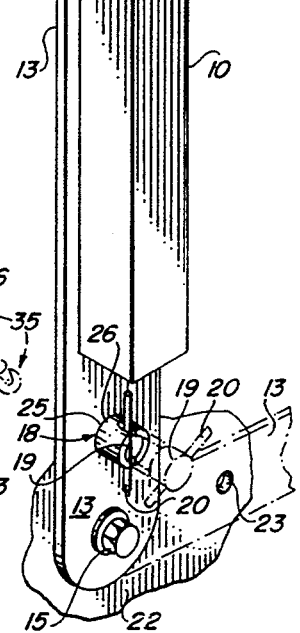

GAME HANDLING APPARATUS

BACKGROUND OF THE INVENTION

FIELD OF THE INVENTION

This invention relates to all-terrain vehicles and techniques for handling game and other loads and more particularly, to a game-handling apparatus mounted on a winch-equipped all-terrain vehicle for lifting game into field-dressing position or onto the all-terrain vehicle for transportation. In a preferred embodiment the game-handling apparatus is designed to operate with a winch fitted with a rotating drum and a winch line wound on the drum, and includes a front roller or pulley mounted on the front of the all-terrain vehicle above the winch, a roll bar pivotally secured to the all-terrain vehicle behind the driver's seat and adapted to extend into upright, locked position, with a top bar roller or pulley fitted to the roll bar for guiding the winch line from the front pulley or roller, and a rear pulley or roller mounted on the rear of the all-terrain vehicle for guiding the winch line from the top bar pulley or roller downwardly for attachment to a sling. The sling may be fitted around a game animal such as a deer and the winch then operated to wind the winch line on the respective rollers and lift the deer into field dressing position or onto the all-terrain vehicle for transportation. The roll bar may be pivoted into a downwardly stored and travelling configuration by manipulation of a pair of lock pins attached to the extending, pivotally-mounted legs of the roll bar. Furthermore, in a most preferred embodiment of the invention the roll bar legs receive a telescoping top bar which carries the top bar roller or pulley and is telescopically adjustable with respect to the roll bar legs by means of retainer pins to adjust the height of the roll bar and the top bar roller.

One of the problems which is inherent in the handling of game animals in the field is that of lifting or carrying the carcass for field-dressing purposes or from frequently remote locations to a camp or other area where the game can be dressed. Such game typically include deer, elk, moose and the like, which are heavy animals and since hunters frequently hunt alone, the difficulty of handling, moving and transporting such game is well understood. Conventional techniques for field-dressing game at the point of harvest include using a block and tackle mounted on a tree limb to hoist the game into position for field-dressing or loading onto a four-wheel all-terrain vehicle or other vehicle for transportation to the camp. Accordingly, under circumstances where the game is killed in a location remote from trees, the game must be dragged or otherwise transported to a tree having favorably disposed limbs for receiving the block and tackle. The time, effort and energy expended in moving the game from one place and position to another for field dressing and/or transportation to the camp is objectionable to most hunters, particularly when hunting time is sometimes limited.

Accordingly, it is object of this invention to provide a new and improved game-handling apparatus for mounting on an all-terrain vehicle and raising game to a suitable height for field-dressing or loading the game into the all-terrain vehicle.

Another object of the invention is to provide a game-handling apparatus for handling game in a quick and efficient manner and transporting the game to a camp or other location, which apparatus operates with a winch mounted on the all-terrain vehicle and includes a first roller or pulley mounted on the all-terrain vehicle above the winch for receiving the winch line from the winch and guiding the winch line upwardly, a roll bar pivotally attached to the all-terrain vehicle and fitted with a top bar pulley or roller for guiding the winch line rearwardly and a rear roller mounted on the all-terrain vehicle for receiving the winch line and guiding the winch line downwardly to the game. A sling can then be mounted on the end of the winch line and the game animal positioned in the sling to raise the game for field-dressing or transportation.

SUMMARY OF THE INVENTION

These and other objects of the invention are provided in a new and improved game-handling apparatus for mounting on an all-terrain vehicle having a winch mounted on the front end of the all-terrain vehicle and fitted with a winch drum having a winch line wound thereon, which apparatus includes a front roller mounted on the all-terrain vehicle above the winch for guiding the winch line upwardly, a telescoping roll bar pivotally secured to the all-terrain vehicle behind the driver's seat, either forward of or over the rear axle, a roll bar roller attached to the roll bar in alignment with the front roller for receiving and guiding the winch line rearwardly and a rear roller secured to the rear end of the all-terrain vehicle in alignment with the roll bar roller, for receiving and guiding the winch line downwardly to a sling attached to the end of the winch line for engaging the game and raising the game for field-dressing or loading in the rear end of the all-terrain vehicle for transportation.

BRIEF DESCRIPTION OF THE DRAWING

The invention will be better understood by reference to the accompanying drawing, wherein:

FIG. 1 is a perspective view of a preferred embodiment of the game-handling apparatus mounted on a four-wheel all-terrain vehicle equipped with a conventional winch;

FIG. 2 is a side view of the game-handling apparatus and all-terrain vehicle illustrated in FIG. 1;

FIG. 3 is a perspective view of the front roller element of the game-handling apparatus;

FIG. 4 is a perspective view, partially in section, of roll bar and roll bar roller elements of the game-handling apparatus; and FIG. 5 is a perspective view of a rear roller element of the game-handling apparatus of this invention.

DESCRIPTION OF THE PREFERRED EMBODIMENTS

Referring initially to FIGS. 1-3 of the drawing, the game-handling apparatus of this invention is generally illustrated by reference numeral 1. The game-handling apparatus 1 is mounted on a four-wheel all-terrain vehicle 41, fitted with a front utility rack 42 and a rear utility rack 46. A conventional winch 32 is mounted on the front end of the all-terrain vehicle 41 and a pair of conventional winch cable guide rollers 44 are rotatably spaced on the all-terrain vehicle 41 in alignment with a conventional winch cable 33, fitted with a typical cable hook 34 and wound on a winch drum 32a, as illustrated in FIG. 3. A roll bar 2 element of the game-handling apparatus 1 is pivotally attached to the rear utility rack 46 of the all-terrain vehicle 41, as follows: The roll bar 2 is characterized by a U-shaped top bar 3, which telescopes into a pair of spaced, parallel roll bar legs 10, the bottom ends of which are pivoted to the lock plates 22 on the rear utility rack 46, by means of leg pivot bolts 15, respectively. The roll bar legs 10 are locked into a horizontal or vertical position by means of roll bar locks 18. Each roll bar lock 18 is characterized by a lock pin 19, which is fitted with a transverse tee pin 20 and a lock pin spring (not illustrated) to facilitate selective engagement and disengagement of the lock pin 19 into and from lock pin openings 23, provided in the lock plate 22. Each lock plate 22 is fitted with a pair of spaced lock pin openings 23, such that the lock pin 19 may be used to secure the roll bar 2 in an upright, essentially vertical configuration as illustrated in FIGS. 1 and 2 and a stored, travelling horizontal configuration, as illustrated in phantom in FIG. 2. This pivoting adjustment of the roll bar 2 is facilitated by fitting the lock pins 19 in a corresponding cylindrical lock pin sleeve 25, welded or otherwise fixedly attached to the roll bar legs 10 or to a leg plate 13, upon which each of the roll bar legs 10 is mounted, as illustrated in FIG. 4. The lock pin sleeve 25 is provided with a sleeve slot 26 for selectively receiving a transverse tee pin 20, mounted in each lock pin 19 when the lock pin 19 is registered with one of the lock pin openings 23 in the lock plate 22. Accordingly, when it is desired the lock the roll bar 2 in the upright, vertical configuration illustrated in FIGS. 1 and 2, each of the two lock pins 19 are forced outwardly from the rearmost lock pin openings 23 against the bias of the lock pin spring (mounted in the lock pin sleeve 25) and the transverse tee pins 20 move from the sleeve slots 26 and are rotated with the lock pins 19 to rest on the lock pin sleeve 25. The roll bar legs 10, along with the top bar 3, are then pivoted upwardly into the desired vertical configuration. The lock pins 19 are then released in unison to facilitate registration of the tee pins 20 back into the corresponding sleeve slots 26 of the lock pin sleeves 25 and the bottoms of the lock pins 19 into the corresponding forwardmost lock pin openings 23, to secure the roll bar 2 in the vertical, upright configuration.

Referring now to FIG. 4 of the drawing, in a preferred embodiment of the invention the roll bar 2 can be adjusted in height by removing the leg retainer pins 11, which include pin retainers 12, from registering openings (not illustrated) in the top bar 3 and the corresponding roll bar legs 10 and telescoping the top bar 3 upwardly to a corresponding different set of registering openings in the top bar 3, re-inserting the leg retainer pins 11 in these openings and repositioning the pin retainers 12, to maintain the roll bar 2 in the extended elevated configuration. In an alternative embodiment of the invention the roll bar legs 10 are mounted on leg plates 13 which are pivotally attached to the respective lock plates 22 by means of leg pivot bolts 15, fitted with nuts (not illustrated) as further illustrated in FIG. 4 and heretofore described. In a most preferred embodiment of the invention a solid stiffening rod or bar 4 is welded or otherwise attached to the underside of the top bar 3 of the roll bar 2 to strengthen the top bar 3 under load, as further illustrated in FIG. 4. A top bar pulley 5 is mounted on the top bar 3 and is characterized by a top bar pulley roller 6, mounted on a top bar pulley bracket 7, which is welded or otherwise attached to the top bar 3 by means of a roller pin 8.

Referring now to FIGS. 2 and 3 of the drawing, a front pulley 29 element of the game-handling apparatus 1 is mounted on the front frame of the all-terrain vehicle 41 above the winch cable guide rollers 44 and the front pulley roller 30, rotatable on a front pulley roller bolt 28, operates to receive the winch cable 33 from the winch drum 32a when the winch drum 32a is in freewheeling or reverse operation, to unwind the winch cable 33 from the winch drum 32a. Accordingly, the winch cable 33 extends from the winch cable guide rollers 44 upwardly around the front pulley roller 30 and the top bar pulley roller 6, rearwardly of the all-terrain vehicle 41, as illustrated in FIGS. 1 and 2.

A rear pulley 35 element of the game-handling apparatus 1 is mounted on the rear utility rack 46 of the all-terrain vehicle 41 and includes a rear pulley roller 36, mounted on a rear pulley roller bracket 37, (welded or otherwise attached to the rear utility rack 46) by means of roller inserts 38, fitted with insert pins 39, as illustrated in FIGS. 1, 2 and 5. Accordingly, the winch cable 33 may be extended farther rearwardly from the top bar pulley roller 6 by operation of the winch 32 and rotating the winch drum 32a in reverse direction, to pay out the winch cable 33 from the winch drum 32a. The winch cable 33 is guided downwardly around the rear pulley roller 36 in position such that a sling 48 can be attached to the cable hook 34 on the end of the winch cable 33, as illustrated in FIGS. 1 and 2 and the sling 48 is then extended around the carcass of an animal such as a deer (not illustrated). The winch 32 can then be operated in conventional manner to rotate the winch drum 32a in the opposite, cable-winding direction and the aligned winch cable 33 wound on the winch drum 32a to raise the game against the rear utility rack 46 and the rear pulley roller 36 to a desired elevated position for field dressing or for loading onto the rear utility rack 46, as desired.

Referring again to FIGS. 1, 2 and 4 of the drawing, under circumstances where it is desired to field-dress the game in place without transporting the game to a camp or other location, or in case of a very large game animal, the roll bar 2 may be elevated to maximum extension by initially raising the roll bar 2 into the vertical configuration illustrated in FIGS. 1 and 2 by manipulation of the respective lock pins 19, as described above. The top bar 3 is then telescopically extended with respect to the roll bar legs 10 by removing the leg retainer pins 11 from registration with corresponding pin openings (not illustrated) in the top bar 3 and the roll bar legs 10 and extending the top bar 3 with respect to the roll bar legs 10. The leg retainer pins 11 are then re-inserted in newly aligned pin openings (not illustrated) provided in the top bar 3 and the roll bar legs 10 and the pin retainers 12 then realigned to secure the leg retainer pins 11 in place. This facility raises the top bar 3 and the top bar pulley 5 to a sufficiently high orientation to allow raising of the game into a suitable position resting against the rear utility rack 46 for field-dressing purposes. Alternatively, the game can be raised to a desired position above the rear utility rack 46 and the winch 32 then operated in reverse to allow the winch cable 33 to unwind from the winch drum 32a and deposit the game animal on the rear utility rack 46. The sling 48 is then removed from contact with the game animal and cable hook 34, and the winch 32 is again operated to rewind the winch cable 33 onto the winch drum 32a into a conventional travelling configuration. The roll bar 2 is then re-adjusted to recess and telescope the top bar 3 into the respective roll bar legs 10 by removing and then re-inserting the leg retainer pins 11, as described above and the roll bar 2 is finally pivoted from the vertical to the horizontal travelling configuration by manipulating the spring-loaded lock pins 19, also as described above.

It will be appreciated by those skilled in the art that the game-handling apparatus of this invention is characterized by convenience and flexibility, in that the apparatus makes use of the conventional winch 32, winch drum 32a and winch cable 33, as well as the cable hook 34, provided on many conventional all-terrain vehicles 41. As such, the winch 32 performs an integral role and is an indispensable component for operating the game-handling apparatus 1. It will be further appreciated that the game-handling apparatus 1 can be used for many purposes other than handling and transporting game. For example, the all-terrain vehicle 41 can be used to transport various heavy and/or bulky items such as lumber, building materials, sacks of sand, fertilizer, concrete and the like and other objects, as desired, by utilizing the winch 32 and winch cable 33 in combination with the roll bar 2 and the various rollers of the game-handling apparatus 1, in the same manner described above with regard to the handling and transportation of game. Since the roll bar 2 is positioned forward of, or at least directly over, the rear axle of the all-terrain vehicle 41, tipping of the all-terrain vehicle is prevented, even with heavy loads attached to the winch line 33. Furthermore, the all-terrain vehicle 41 upon which the game-handling apparatus 1 is mounted, can be characterized by three or four wheels, although the all-terrain vehicle 41 which is fitted with four wheels is much more stable and is a preferred vehicle for installation and use of the game-handling apparatus 1.

Accordingly, while the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A game-handling apparatus for handling and loading game into an all-terrain vehicle having an open passenger area, a winch and winch cable, comprising roll bar means carried by the all-terrain vehicle for movement between a first position protecting said passenger area and a second position extending to the rear of said vehicle; and roll bar roller means rotatably carried by said roll bar means and vehicle roller means carried by the all-terrain vehicle, for receiving the winch cable and handling and loading the game responsive to extension of the winch cable around said vehicle roller means and said roll bar roller means, connecting the winch cable to the game and operating the winch.

2. The game-handling apparatus of claim 1 comprising telescoping means provided on said roll bar means for selectively raising and lowering said roll bar roller means and the winch cable with respect to the game.

3. The game-handling apparatus of claim 1 comprising roll bar pivot means carried by the all-terrain vehicle and engaging said roll bar means and roll bar lock means carried by said roll bar means and selectively engaging the all-terrain vehicle, whereby said roll bar means is selectively pivoted on said roll bar pivot means to an upright position and a folded position, responsive to manipulation of said roll bar lock means.

4. The game-handling apparatus of claim 3 comprising telescoping means provided on said roll bar means for selectively raising and lowering said roll bar roller means and the winch cable with respect to the game.

5. The game-handling apparatus of claim 1 wherein the winch is mounted on the front of the all-terrain vehicle, said vehicle roller means comprises a front roller mounted for rotation on the front of the all-terrain vehicle and a rear roller mounted for rotation on the rear of the all-terrain vehicle and said roll bar means is mounted on the all-terrain vehicle between said front roller and said rear roller, with said roll bar roller means disposed in alignment with said front roller and said rear roller for receiving the winch cable.

6. The game-handling apparatus of claim 5 comprising telescoping means provided on said roll bar means for selectively raising and lowering said roll bar roller means and the winch cable with respect to the game.

7. The game-handling apparatus of claim 5 comprising roll bar pivot means carried by the all-terrain vehicle and engaging said roll bar means and roll bar lock means carried by said roll bar means and selectively engaging the all-terrain vehicle, whereby said roll bar means is selectively pivoted on said roll bar pivot means to an upright position and a folded position, responsive to manipulation of said roll bar lock means.

8. The game-handling apparatus of claim 5 comprising:
   (a) telescoping means provided on said roll bar means for selectively raising and lowering said roll bar roller means and the winch cable with respect to the game; and
   (b) roll bar pivot means carried by the all-terrain vehicle and engaging said roll bar means and roll bar lock means carried by said roll bar means and selectively engaging the all-terrain vehicle, whereby said roll bar means is selectively pivoted on said roll bar pivot means to an upright position and a folded position, responsive to manipulation of said roll bar lock means.

9. The game-handling apparatus of claim 1 comprising sling means connected to the winch cable for engaging and lifting the game responsive to operation of the winch.

10. The game-handling apparatus of claim 9 comprising telescoping means provided on said roll bar means for selectively raising and lowering said roll bar roller means and the winch cable with respect to the game and roll bar pivot means carried by the all-terrain vehicle and engaging said roll bar means and roll bar lock means carried by said roll bar means and selectively engaging the all-terrain vehicle, whereby said roll bar means is selectively pivoted on said roll bar pivot means to an upright position and a folded position, responsive to manipulation of said roll bar lock means.

11. The game-handling apparatus of claim 10 wherein the winch is mounted on the front of the all-terrain vehicle, said vehicle roller means comprises a front roller mounted for rotation on the front of the all-terrain vehicle and a rear roller mounted for rotation on the rear of the all-terrain vehicle and said roll bar means is mounted on the all-terrain vehicle between said front roller and said rear roller, with said roll bar roller means disposed in alignment with said front roller and said rear roller for receiving the winch cable.

12. The game-handling apparatus of claim 10 wherein said telescoping means comprises a pair of roll bar legs pivotally mounted on said roll bar pivot means and releasably engaging said roll bar lock means, respectively, a generally U-shaped top bar slidably and adjustably engaging said roll bar legs for mounting said roll bar roller means and adjusting means releasably engaging said roll bar legs and said top bar for selectively adjusting said top bar and said roll bar roller means with respect to said roll bar legs.

13. The game-handling apparatus of claim 12 wherein the winch is mounted on the front of the all-terrain vehicle, said vehicle roller means comprises a front roller mounted for rotation on the front of the all-terrain vehicle and a rear roller mounted for rotation on the rear of the all-terrain vehicle and said roll bar legs are mounted on the all-terrain vehicle between said front roller and said rear roller, with said roll bar roller means disposed in alignment with said front roller and said rear roller for receiving the winch cable.

14. The game-handling apparatus of claim 13 wherein said sling means comprises a flexible sling connected to the winch cable for engaging and lifting the game responsive to operation of the winch.

15. A game-handling apparatus for handling game and loading game into an all-terrain vehicle having an open passenger area, a winch mounted on the front of the all-terrain vehicle, a winch drum rotatable on the winch and a winch cable wound on the winch drum, said game-handling apparatus comprising a front roller mounted for rotation on the front of the all-terrain vehicle for receiving the winch cable and guiding the winch cable upwardly; a roll bar pivotally carried by the all-terrain vehicle for protecting said passenger area; lock means carried by said roll bar for selectively engaging the all-terrain vehicle and selectively immobilizing said roll bar in an upright, functional configuration and a substantially horizontal, travelling configuration; a roll bar roller mounted for rotation on said roll bar for receiving the winch cable and guiding the winch cable from said front roller to the rear of the all-terrain vehicle; and a rear roller mounted for rotation on the rear of the all-terrain vehicle for receiving the winch cable and guiding the winch cable from said roll bar roller downwardly to the game, whereby the winch cable is secured to the game and the game is handled responsive to operation of the winch, the winch drum and the winch cable.

16. The game-handling apparatus of claim 15 comprising telescoping means provided on said roll bar for selectively raising and lowering said roll bar roller and the winch cable with respect to the game.

17. The game-handling apparatus of claim 16 comprising sling means connected to the winch cable for engaging and lifting the game responsive to operation of the winch, the winch drum and the winch cable.

18. In an all-terrain vehicle having an open passenger area, a winch mounted on the front end thereof and a winch line wound on a winch drum provided in the winch, the improvement in combination therewith defining a game-handling apparatus comprising a front roller mounted for rotation on the front of the all-terrain vehicle for receiving said winch cable and guiding said winch cable upwardly; a roll bar pivotally carried by the all-terrain vehicle; lock means carried by said roll bar for selectively engaging the all-terrain vehicle and selectively immobilizing said roll bar in an upright, functional configuration for protecting said passenger area and a substantially horizontal, travelling configuration; a roll bar roller mounted for rotation on said roll bar for receiving said winch cable and guiding said winch cable from said front roller to the rear of the all-terrain vehicle; and a rear roller mounted for rotation on the rear of the all-terrain vehicle for receiving said winch cable from said roll bar roller and guiding said winch cable downwardly to the game, whereby said winch cable is secured to the game and the game is handled responsive to operation of said winch and said winch cable.

19. The game-handling apparatus of claim 18 comprising telescoping means provided on said roll bar for selectively raising and lowering said roll bar roller and said winch cable with respect to the game.

20. The game-handling apparatus of claim 19 comprising sling means connected to said winch cable for engaging and lifting the game responsive to operation of said winch means.

* * * * *